(12) United States Patent
Mochizuki et al.

(10) Patent No.: US 9,686,020 B2
(45) Date of Patent: Jun. 20, 2017

(54) SIGNAL PROCESSING DEVICE AND SIGNAL PROCESSING METHOD (71) Applicant: FUJITSU LIMITED, Kawasaki-shi, Kanagawa (JP)

(72) Inventors: Hikari Mochizuki, Fucyuu (JP); Takeshi Hoshida, Kawasaki (JP); Osamu Takeuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/817,714

(22) Filed: Aug. 4, 2015

(65) Prior Publication Data
US 2016/0094292 A1 Mar. 31, 2016

(30) Foreign Application Priority Data
Sep. 25, 2014 (JP) .................................. 2014-195757

(51) Int. Cl.
*H04B 10/00* (2013.01)
*H04B 10/61* (2013.01)

(52) U.S. Cl.
CPC ....... *H04B 10/6161* (2013.01); *H04B 10/616* (2013.01); *H04B 10/6165* (2013.01)

(58) Field of Classification Search
CPC .............. H04B 10/6161; H04B 10/616; H04B 10/6165
See application file for complete search history.

(56) References Cited

U.S. PATENT DOCUMENTS

| 5,243,610 A * | 9/1993 | Murata | 359/328 |
| 6,263,139 B1 * | 7/2001 | Kawakami | G02B 6/02261 385/123 |
| 7,046,431 B1 * | 5/2006 | Sugaya | H01S 3/06758 359/334 |
| 7,280,766 B2 * | 10/2007 | Watanabe | G02F 1/353 398/147 |

(Continued)

FOREIGN PATENT DOCUMENTS

JP 2011-009956 1/2011

OTHER PUBLICATIONS

Tomofumi Oyama et al., "Impact of Pulse Shaping and Transceiver Electrical Bandwidths on Nonlinear Compensated Transmission", Optical Fiber Communication Conference and Exposition and the National Fiber Optic Engineers Conference (OFC/NFOEC), 2013 (3 pages).

*Primary Examiner* — Danny Leung
(74) *Attorney, Agent, or Firm* — Fujitsu Patent Center (57) ABSTRACT

A signal processing device that processes a digital signal formed by sampling an electric signal using a clock signal, the electric signal being obtained by converting an optical signal inputted from a transmission line, the signal processing device includes: a first chromatic dispersion compensator that compensates a waveform distortion caused by a chromatic dispersion with respect to the digital signal; a first nonlinear optical effect compensator that compensates a waveform distortion caused by a nonlinear optical effect with respect to one signal outputted from the first chromatic dispersion compensator; and a controller that detects a phase fluctuation of other signal outputted from the first chromatic dispersion compensator, and controls the clock signal based on the detected phase fluctuation.

3 Claims, 5 Drawing Sheets (56) References Cited

U.S. PATENT DOCUMENTS

| | | | | |
|---|---|---|---|---|
| 2001/0046077 A1* | 11/2001 | Akiyama | ......... | H04B 10/25133 398/147 |
| 2002/0076182 A1* | 6/2002 | Terahara | ............ | G02B 6/29377 385/122 |
| 2002/0191275 A1* | 12/2002 | Kinoshita | ........... | H01S 3/06758 359/337.5 |
| 2003/0099030 A1* | 5/2003 | Kumasako | ......... | H04B 10/2916 359/334 |
| 2006/0140567 A1* | 6/2006 | Kittaka | .................. | B82Y 20/00 385/129 |
| 2009/0095890 A1* | 4/2009 | Tanaka | .................... | G02F 1/365 250/225 |
| 2010/0329697 A1* | 12/2010 | Koizumi | .................. | H03J 7/26 398/208 |
| 2014/0029959 A1* | 1/2014 | Koizumi | .................. | H03J 7/26 398/208 |
| 2015/0372766 A1* | 12/2015 | Yoshida | ............. | H04B 10/2507 398/193 |
| 2016/0094292 A1* | 3/2016 | Mochizuki | ......... | H04B 10/6165 398/208 |
| 2016/0211920 A1* | 7/2016 | Aono | .................. | H04J 14/0238 |
| 2016/0336965 A1* | 11/2016 | Koganei | ............. | H03M 13/616 |
| 2016/0337036 A1* | 11/2016 | Yoshida | ............... | H04B 10/556 |
| 2017/0026114 A1* | 1/2017 | Sugitani | ................. | H04B 10/25 |

\* cited by examiner

SIGNAL PROCESSING DEVICE AND SIGNAL PROCESSING METHOD

CROSS-REFERENCE TO RELATED APPLICATION

This application is based upon and claims the benefit of priority of the prior Japanese Patent Application No. 2014-195757 filed on Sep. 25, 2014, the entire contents of which are incorporated herein by reference.

FIELD

A certain aspect of the embodiments is related to a signal processing device and a signal processing method.

BACKGROUND

For example, in accordance with increase of the demand for large-capacity data transmission, the research and development of a digital coherent optical transmission system that enables data transmission more than 100 (Gbps) by a single wavelength light are performed. In the digital coherent optical transmission system, not only an intensity of light but also a phase of the light is used for signal modulation, unlike an intensity modulation system. For example, DP (Dual-Polarization)-QPSK (Quaternary Phase Shift Keying) is mentioned as such a modulation system.

A receiver of the digital coherent optical transmission system detects a signal received from a transmission line by using a local oscillation light, samples the detection result by a clock signal, and then compensate a waveform distortion of the signal caused in the transmission line. In such a receiver, there is known a function that performs a phase synchronization by detecting a phase shift of the sampling from the signal in which the waveform distortion is compensated, and controlling the clock signal on the basis of the phase shift (see e.g. Japanese Laid-open Patent Publication No. 2011-9956).

Moreover, when a nonlinear compensator (NLC) is provided in the receiver, there is known an effect that the waveform distortion of the signal caused by a nonlinear optical effect in the transmission line is compensated and an OSNR (Optical Signal to Noise Ratio) tolerance is improved (See e.g. T. Oyama, et al., "Impact of Pulse Shaping and Transceiver Electrical Bandwidths on Nonlinear Compensated Transmission," in Optical Fiber Communication Conference/National Fiber Optic Engineers Conference 2013, OSA Technical Digest (online) (Optical Society of America, 2013), paper OTh3C.2.).

SUMMARY

According to an aspect of the present invention, there is provided a signal processing device that processes a digital signal formed by sampling an electric signal using a clock signal, the electric signal being obtained by converting an optical signal inputted from a transmission line, the signal processing device including: a first chromatic dispersion compensator that compensates a waveform distortion caused by a chromatic dispersion with respect to the digital signal; a first nonlinear optical effect compensator that compensates a waveform distortion caused by a nonlinear optical effect with respect to one of two signals outputted from the first chromatic dispersion compensator; and a controller that detects a phase fluctuation of the other one of the two signals outputted from the first chromatic dispersion compensator, and controls the clock signal based on the detected phase fluctuation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the conventional receiver, when the nonlinear compensator (NLC), and a chromatic dispersion compensator (CDC) that compensates a chromatic dispersion of the signal caused in the transmission line are disposed in the receiver, the waveform distortion of the signal is compensated effectively. However, since a circuit delay is included in the NLC and the CDC, the delay (latency) of the signal increases in accordance with increase of the compensators. Therefore, even if the clock signal using the sampling is controlled, there is a problem that a following property of the clock signal (i.e., the responsibility of a phase locked loop) deteriorates and the phase fluctuation of the signal is not suppressed.

First Comparative Example

Figure 1:
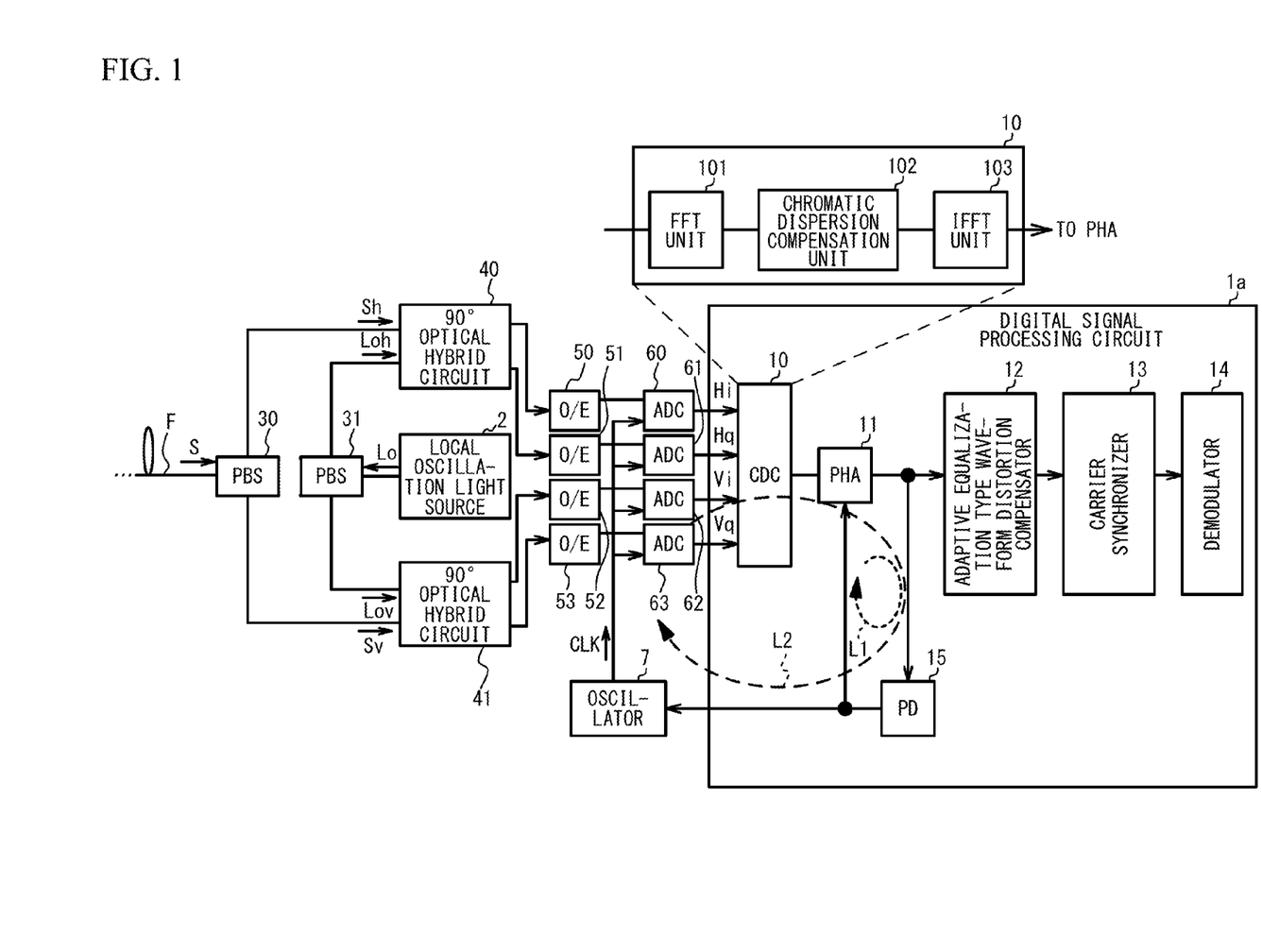
FIG. 1 is a diagram illustrating a configuration of a receiver according to a first comparative example.

FIG. 1 is a diagram illustrating a configuration of a receiver according to a first comparative example. The receiver receives an optical signal S transmitted from a transmitter according to a digital coherent optical transmission system, detects the optical signal S by a local oscillation light Lo, converts the optical signal S into digital signals Hi, Hq, Vi and Vq, and demodulates the signals according to a demodulation system corresponding to a modulation system of the transmitter. As an example, DP (Dual-Polarization)-QPSK (Quaternary Phase Shift Keying) is mentioned as the modulation system, but the modulation system is not limited to this. PSK (Phase Shift Keying) and QAM (Quadrature Amplitude Modulation) may be used. The optical signal S may be a signal in which a plurality of modulation signals are multiplexed by a method such as OFDM (Orthogonal Frequency Division Multiplexing).

The receiver includes a local oscillation light source 2, polarization beam splitters (PBS) 30 and 31, 90° optical hybrid circuits 40 and 41, and photoelectric conversion circuits (O/E) 50 to 53. Moreover, the receiver includes analog-digital converter (ADC) 60 to 63, an oscillator 7, and a digital signal processing circuit 1a.

The PBS 30 splits the optical signal S inputted from the transmitter via a transmission line F into an H axis and a V axis (polarization axes). Signal light components Sh and Sv of the H axis and the V axis are inputted to the 90° optical hybrid circuits 40 and 41, respectively. Not only an optical fiber but also a free space, an optical waveguide formed to a semiconductor substrate, and an optical element to be used by an optical transceiver and an optical repeater are mentioned as the transmission line F.

Moreover, the local oscillation light source 2 outputs to the PBS 31 the local oscillation light Lo synchronized with an output light of the transmitter. The PBS 31 splits the local oscillation light Lo into the H axis and the V axis (polarization axes). Local oscillation light components Loh and Lov of the H axis and the V axis are inputted to the 90° optical hybrid circuits 40 and 41, respectively.

The 90° optical hybrid circuit 40 has a waveguide for making the inputted signal light component Sh and the inputted local oscillation light component Loh interfere with each other, and detects the signal light component Sh. The 90° optical hybrid circuit 40 outputs, as a result of the detection, an optical component depending on an amplitude and a phase of the I-channel and an optical component depending on an amplitude and a phase of the Q-channel to the photoelectric conversion circuits 50 and 51, respectively.

The 90° optical hybrid circuit 41 has a waveguide for making the inputted signal light component Sv and the inputted local oscillation light component Lov interfere with each other, and detects the signal light component Sv. The 90° optical hybrid circuit 41 outputs, as a result of the detection, an optical component depending on an amplitude and a phase of the I-channel and an optical component depending on an amplitude and a phase of the Q-channel to the photoelectric conversion circuits 52 and 53, respectively.

The photoelectric conversion circuits 50 to 53 convert the inputted optical components into electric signals, and outputs the electric signals to the ADC 60 to 63, respectively. Photodetectors are used as the photoelectric conversion circuits 50 to 53, for example.

The ADC 60 to 63 sample the electric signals inputted from the photoelectric conversion circuits 50 to 53 by using a clock signal CLK inputted from the oscillator 7, and hence converts the electric signals into digital signals Hi, Hq, Vi and Vq, respectively. That is, the digital signals Hi, Hq, Vi and Vq are generated by sampling the electric signals in synchronization with the clock signal CLK. The digital signals Hi, Hq, Vi and Vq are inputted to the digital signal processing circuit 1a.

The oscillator 7 changes a frequency of the clock signal CLK in accordance with a control from the digital signal processing circuit 1a. That is, the frequency of the clock signal CLK is variable. A voltage-controlled oscillator (VCO) is used as the oscillator 7, for example.

The digital signal processing circuit 1a includes a chromatic dispersion compensator (CDC) 10, a phase adjuster (PHA) 11, an adaptive equalization type waveform distortion compensator 12, a carrier synchronizer 13, and a demodulator 14 and a phase detector (PD) 15. The digital signal processing circuit 1a is composed of one or more DSPs (Digital Signal Processor), for example.

The CDC 10 compensates the waveform distortion of the digital signals Hi, Hq, Vi and Vq generated by chromatic dispersion in the transmission line. The CDC 10 includes a FFT (Fast Fourier Transform) unit 101, a chromatic dispersion compensation unit 102, and an IFFT (Inverse FFT) unit 103.

The FFT unit 101 converts the digital signals Hi, Hq, Vi and Vq from signals of a time domain to signals of a frequency domain. The chromatic dispersion compensation unit 102 compensates the waveform distortion caused by the chromatic dispersion by adding a characteristic opposite to a characteristic of the chromatic dispersion in the transmission line F to the digital signals Hi, Hq, Vi and Vq divided every frequency.

Thus, since the chromatic dispersion compensation unit 102 processes the digital signals Hi, Hq, Vi and Vq every frequency, the waveform distortion can be compensated easily and a circuit scale is reduced. The IFFT unit 103 converts the digital signals Hi, Hq, Vi and Vq whose waveform distortion has been compensated, from signals of the frequency domain to signals of the time domain. The digital signals Hi, Hq, Vi and Vq which have returned to the signals of the time domain are outputted to the PHA 11.

The PHA 11 and the PD 15 constitute a phase locked loop L1 for controlling the phase of the digital signals Hi, Hq, Vi and Vq. The PD 15 detects the phase fluctuation of the digital signals Hi, Hq, Vi and Vq outputted from the PHA 11. A phase detector of the Gardner system is used as a detection means of the phase fluctuation, for example. In order to compensate deterioration in a detection sensitivity, the PD 15 may correct the phase detected by the phase detector, based on the change of the inclination of a sensitivity straight line acquired by shifting the phase in each of positive and negative directions by a same amount. Here, the Gardner system is described in a document "F. M. Gardner, IEEE Transactions on Communications, 34, No. 5, 1986", for example. Various systems other than the Gardner system exist as a system for the phase detector, but the operation in this example does not depend on the selection of the phase detection system.

The PHA 11 adjusts (compensates) a sampling phase by delaying the digital signals Hi, Hq, Vi and Vq based on a detection result of the PD 15. The PHA 11 can adjust the sampling phase by multiplying the digital signals Hi, Hq, Vi and Vq converted into the signals of the frequency domain by a rotor coefficient corresponding to a target value of the phase. Alternatively, the PHA 11 can adjust the sampling phase by setting an appropriate tap coefficient to a FIR (Finite Impulse Response) filter of the time domain. Thereby, high-speed phase fluctuation such as a jitter caused in the digital signals Hi, Hq, Vi and Vq in the receiver is reduced. The PHA 11 outputs the digital signals Hi, Hq, Vi and Vq whose phase has been adjusted to the adaptive equalization type waveform distortion compensator 12.

The ADCs 60 to 63, the CDC 10, the PHA 11, the PD 15 and the oscillator 7 constitute a phase locked loop L2 for controlling the phase of the digital signals Hi, Hq, Vi and Vq. The oscillator 7 adjusts the frequency of the clock signal CLK based on the detection result of the PD 15. Consequently, the sampling phase of the ADCs 60 to 63 is controlled depending on a phase shift of the digital signals Hi, Hq, Vi and Vq.

Therefore, low-speed phase fluctuation such as a wander caused in the digital signals Hi, Hq, Vi and Vq in the transmission line F is reduced. Moreover, the ADCs 60 to 63 can perform high-speed sampling of several 10 GHz, for example, without increasing the circuit scale.

The adaptive equalization type waveform distortion compensator 12 compensates the waveform distortion of the digital signals Hi, Hq, Vi and Vq. The adaptive equalization type waveform distortion compensator 12 includes a plurality of filter circuits, and compensates the waveform distortion that fluctuates faster than waveform distortion of the CDC 10 to be compensated by changing in real time the characteristics of the filter circuits depending on the characteristic of the digital signals Hi, Hq, Vi and Vq. The digital signals Hi, Hq, Vi and Vq whose waveform distortion has been compensated are outputted to the carrier synchronizer 13.

The carrier synchronizer 13 corrects differences of the frequency and the phase between a light source of the transmitter and the local oscillation light source 2 so that the digital signals Hi, Hq, Vi and Vq are normally demodulated by a signal constellation (a signal space diagram) depending on a modulation system. The signal constellation is a diagram which expresses a signal point corresponding to the amplitude and the phase of a signal on a complex plane having a real axis (I) and an imaginary axis (Q).

The carrier synchronizer 13 presumes and corrects the differences of the frequency and the phase which the carrier of the digital signals Hi, Hq, Vi and Vq has. A presumption means of the difference of the phase is described in a document "M. G. Taylor, "Phase Estimation Methods for Optical Coherent Detection Using Digital Signal Processing", JOURNAL OF LIGHTWAVE TECHNOLOGY, VOL. 27, NO. 7, APRIL 1, 901-914, 2009", for example. The carrier synchronizer 13 outputs the digital signals Hi, Hq, Vi and Vq in which correction process is performed, to the demodulator 14.

The demodulator 14 demodulates the digital signals Hi, Hq, Vi and Vq by recognizing the signal point based on the signal constellation depending on the modulation system.

In the receiver of the first comparative example, the CDC 10 can compensates the waveform distortion of the digital signals Hi, Hq, Vi and Vq caused by the chromatic dispersion in the transmission line F, but cannot compensate the waveform distortion of the digital signals Hi, Hq, Vi and Vq caused by a nonlinear optical effect in the transmission line. Therefore, in a second comparative example mentioned later, a nonlinear compensator (NLC) is added to the receiver.

Second Comparative Example

Figure 2:
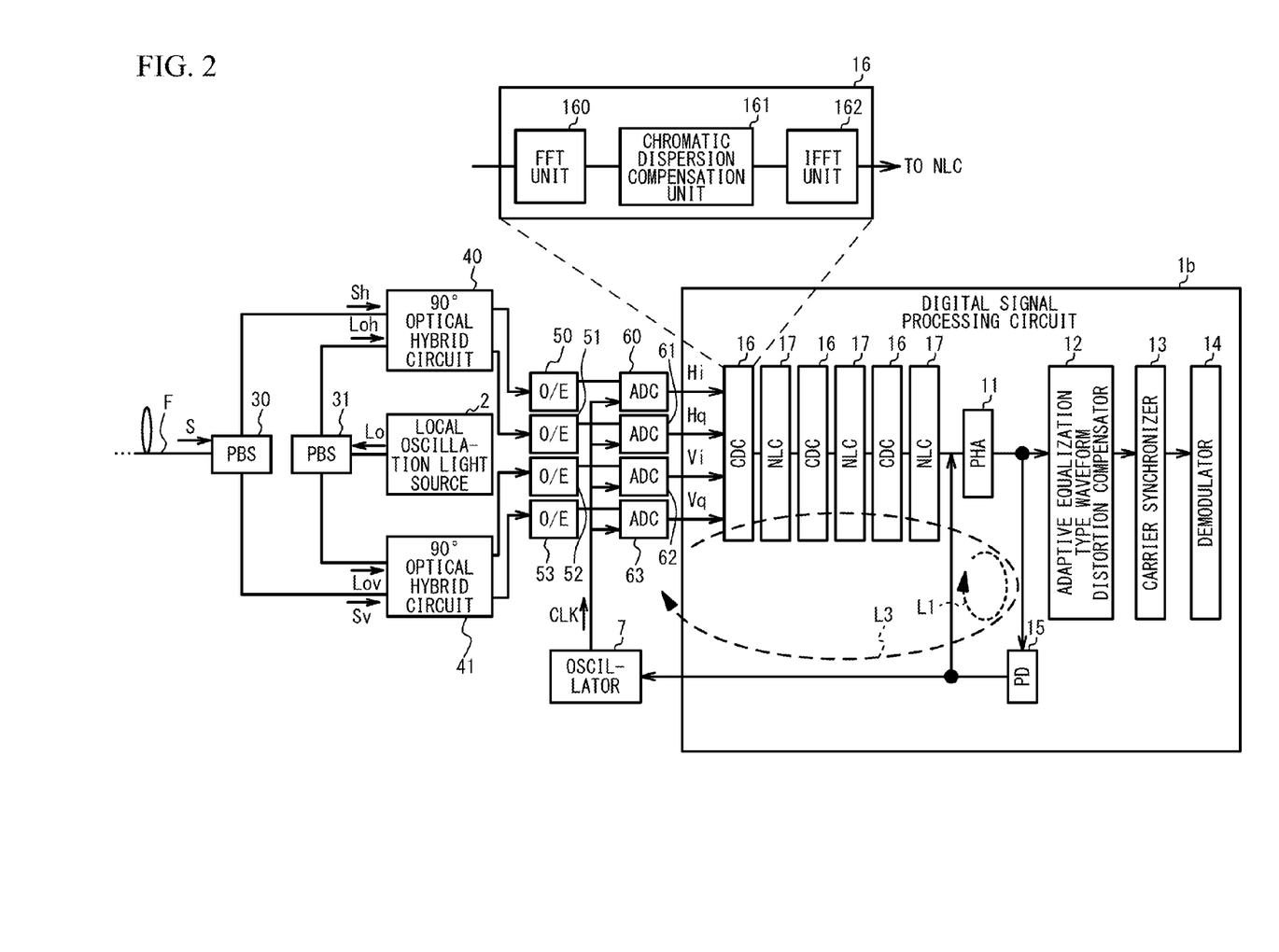
FIG. 2 is a diagram illustrating a configuration of a receiver according to a second comparative example.

FIG. 2 is a diagram illustrating a configuration of a receiver according to a second comparative example. In FIG. 2, elements common to those in FIG. 1 are designated by the same numbers, and a description thereof is omitted.

The receiver includes the local oscillation light source 2, the PBSs 30 and 31, the 90° optical hybrid circuits 40 and 41, the photoelectric conversion circuits 50 to 53, the ADCs 60 to 63, the oscillator 7 and a digital signal processing circuit 1b.

The digital signal processing circuit 1b includes three pairs (three stages) of CDC (chromatic dispersion compensator) 16 and NLC (nonlinear compensator) 17, the PHA 11, the adaptive equalization type waveform distortion compensator 12, the carrier synchronizer 13, and the demodulator 14 and the PD 15. The digital signal processing circuit 1b processes the digital signals Hi, Hq, Vi and Vq formed by sampling the electric signals using the clock signal CLK of the oscillator 7. The electric signals are obtained by converting the optical signal S inputted from the transmission line F. The digital signal processing circuit 1b is composed of one or more DSPs (Digital Signal Processor), for example.

The three pairs (three stages) of CDCs 16 and NLCs 17 are an example of a plurality of stages of first compensators that compensate the waveform distortion of the digital signals Hi, Hq, Vi and Vq caused by the chromatic dispersion and the nonlinear optical effect in the transmission line. The CDCs 16 and the NLCs 17 are alternately arranged in the digital signal processing circuit 1b. The compensation of the waveform distortion is effectively performed on the digital signals Hi, Hq, Vi and Vq by synergy of the CDCs 16 and the NLCs 17, and an OSNR (Optical Signal to Noise Ratio) tolerance is improved.

The three stages of CDCs 16 compensate the waveform distortion of the digital signals Hi, Hq, Vi and Vq caused by the chromatic dispersion in the transmission line, as with the CDC 10 of the first comparative example. Each of the CDCs 16 gives the digital signals Hi, Hq, Vi and Vq a quantity in which all compensation quantity for compensation of the waveform distortion by the chromatic dispersion is divided into three. Here, the compensation quantities to be given to the respective CDCs 16 do not need to be necessarily equal to each other. The optimal distribution of the compensation quantities to be given to the respective CDCs 16 is changed depending on a characteristic of the transmission line F, but all the compensation quantities to be given to the respective CDCs 16 may be equal to each other to simplify the control.

Each of the CDCs 16 includes a FFT (Fast Fourier Transform) unit 160, a chromatic dispersion compensation unit 161, and an IFFT (Inverse FFT) unit 162. The FFT unit 160 converts the digital signals Hi, Hq, Vi and Vq from signals of the time domain to signals of the frequency domain. That is, the FFT unit 160 applies Fourier transformation on the digital signals Hi, Hq, Vi and Vq. The chromatic dispersion compensation unit 161 compensates a part of the waveform distortion caused by the chromatic dispersion by adding a characteristic of a phase rotation opposite to a phase rotation caused by the chromatic dispersion in the transmission line F to the digital signals Hi, Hq, Vi and Vq divided every frequency.

Thus, the chromatic dispersion compensation unit 161 processes the digital signals Hi, Hq, Vi and Vq every frequency, so that the chromatic dispersion compensation unit 161 can easily compensate the waveform distortion. When it is premised that the chromatic dispersion compensation unit 161 compensates a large chromatic dispersion value to some extent, the chromatic dispersion compensation unit 161 can be configured with a small scale circuit in comparison with a circuitry which performs processing in the time domain. The IFFT unit 162 converts the digital signals Hi, Hq, Vi and Vq whose waveform distortion has been compensated, from signals of the frequency domain to signals of the time domain.

The three stages of NLCs 17 compensate the waveform distortion of the digital signals Hi, Hq, Vi and Vq caused by the nonlinear optical effect in the transmission line. Each of the NLCs 17 gives the digital signals Hi, Hq, Vi and Vq a quantity in which all compensation quantity for compensation of the waveform distortion by the nonlinear optical effect is divided into three. Here, the compensation quantities to be given to the respective NLCs 17 do not need to be necessarily equal to each other. The optimal distribution of the compensation quantities to be given to the respective NLCs 17 is changed depending on a characteristic of the transmission line F, but all the compensation quantities to be given to the respective NLCs 17 may be equal to each other to simplify the control.

Each of the NLCs 17 compensates the waveform distortion by adjusting a parameter determining the characteristic of the filter, according to a back propagation method, for example. As the nonlinear optical effect causing the waveform distortion to be compensated here, a cross phase modulation (XPM), a four-wave mixing (FWM) and a self phase modulation (SPM) are mentioned. Various systems such as a Volterra filter method other than the back propagation method exist as a system for the NLC 17, but the operation in this example does not depend on the selection of the system for the NLC 17.

Here, in the second comparative example, the three pairs (three stages) of CDCs 16 and NLCs 17 are provided, but the number of stages (i.e., the number of CDCs 16 and NLCs 17) has no limitation. The appropriate number of stages of the CDCs 16 and the NLCs 17 may be provided in the range of 3 to 20 stages. If the number of stages is expressed by "N (an integer of 2 or more)", the chromatic dispersion compensation unit 161 in each of the CDCs 16 gives the digital signals Hi, Hq, Vi and Vq a quantity in which all compensation quantity for compensation of the waveform distortion by the chromatic dispersion is divided into "N". Here, the compensation quantities to be given to the respective NLCs 17 do not need to be necessarily equal to each other. The optimal distribution of the compensation quantities to be given to the respective NLCs 17 is changed depending on the characteristic of the transmission line F, but all the compensation quantities to be given to the respective NLCs 17 may be equal to each other to simplify the control.

Moreover, each of the NLCs 17 gives the digital signals Hi, Hq, Vi and Vq a quantity in which all compensation quantity for compensation of the waveform distortion by the nonlinear optical effect is divided into "N". Here, the compensation quantities to be given to the respective chromatic dispersion compensation units 161 do not need to be necessarily equal to each other. The optimal distribution of the compensation quantities to be given to the respective chromatic dispersion compensation units 161 is changed depending on the characteristic of the transmission line F, but all the compensation quantities to be given to the respective chromatic dispersion compensation units 161 may be equal to each other to simplify the control.

Moreover, the ADCs 60 to 63, the three stages of CDCs 16 and NLCs 17, the PHA 11, the PD 15 and the oscillator 7 constitute a phase locked loop L3 for controlling the phase of the digital signals Hi, Hq, Vi and Vq. Thereby, the oscillator 7 adjusts the frequency of the clock signal CLK based on the detection result of the PD 15. Consequently, the sampling phase of the ADCs 60 to 63 is controlled depending on the phase shift of the digital signals Hi, Hq, Vi and Vq.

However, in the above-mentioned control, the delay (latency) of the digital signals Hi, Hq, Vi and Vq caused by the three stages of the CDCs 16 and the NLCs 17 in the phase locked loop L3 becomes a problem. Especially, when there are a large number of stages of the CDCs 16 and the NLCs 17, a large delay occurs. Therefore, the following property (responsibility) of the clock signal CLK deteriorates and the phase fluctuation, such as the wander, is not suppressed.

Embodiment

Accordingly, in a present embodiment, the compensation of the chromatic dispersion and the nonlinear optical effect of the plural stages is performed on the digital signals Hi, Hq, Vi and Vq sampled by the clock signal CLK, and the phase of the clock signal CLK is controlled based on the phase fluctuation after the compensation of the chromatic dispersion of the digital signals Hi, Hq, Vi and Vq branched from a stage before a final stage. Thereby, the delay time in the phase locked loop is reduced, and hence the phase fluctuation is suppressed.

Figure 3:
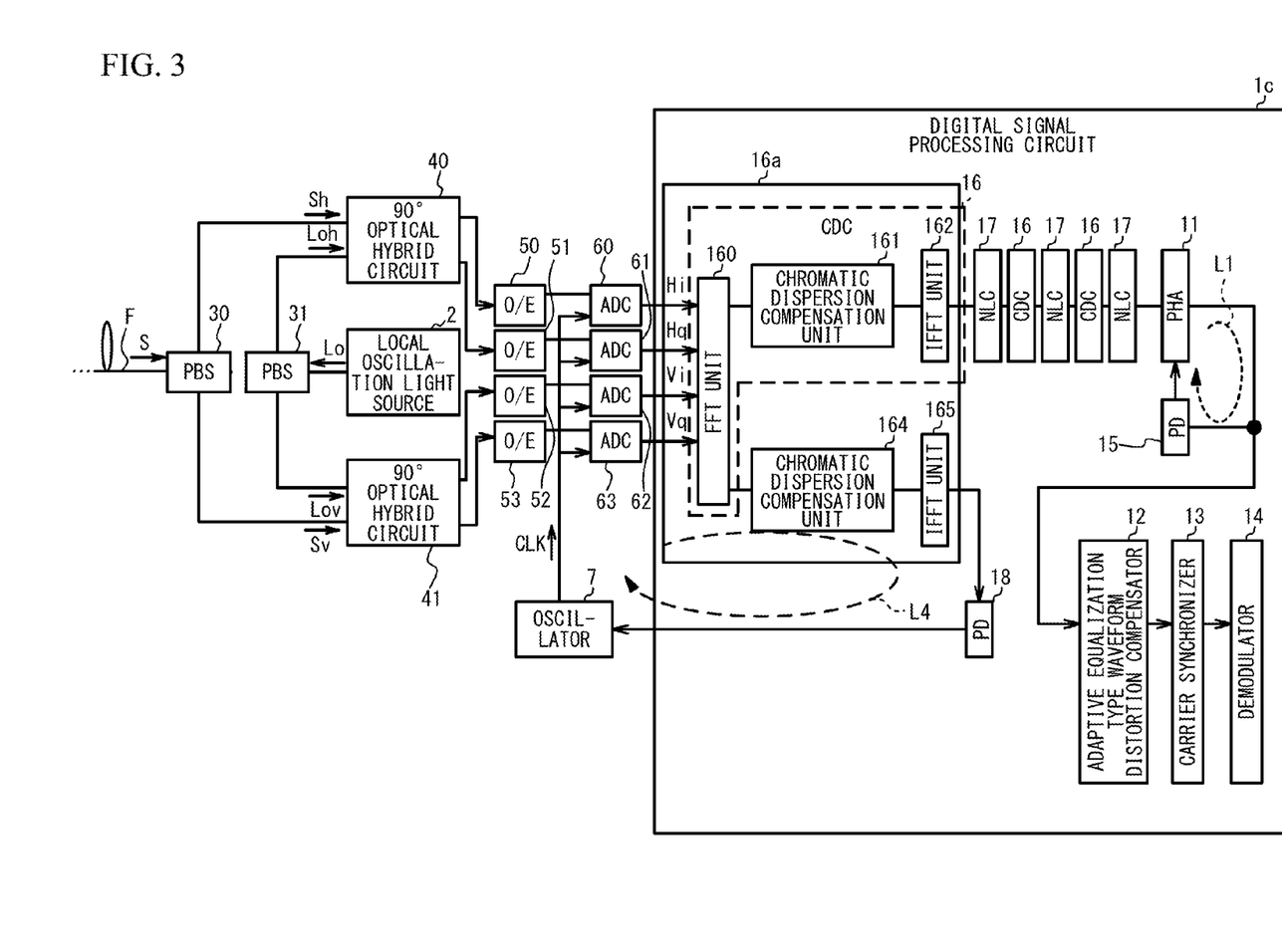
FIG. 3 is a diagram illustrating a configuration of a receiver according to an embodiment.

FIG. 3 is a diagram illustrating a configuration of the receiver according to the embodiment. In FIG. 3, elements common to those in FIGS. 1 and 2 are designated by the same numbers, and a description thereof is omitted.

The receiver includes the local oscillation light source 2, the PBSs 30 and 31, the 90° optical hybrid circuits 40 and 41, the photoelectric conversion circuits 50 to 53, the ADCs 60 to 63, the oscillator 7 and a digital signal processing circuit 1c.

The digital signal processing circuit 1c is an example of a signal processing device, and includes the three stages of CDCs 16a and 16, the three stages of NLCs 17, the PHA 11, the adaptive equalization type waveform distortion compensator 12, the carrier synchronizer 13, and the demodulator 14, the PD 15 and a PD 18. The digital signal processing circuit 1c processes the digital signals Hi, Hq, Vi and Vq formed by sampling the electric signals using the clock signal CLK. The electric signals are obtained by converting the optical signal S inputted from the transmission line F. The digital signal processing circuit 1c is composed of one or more DSPs, for example.

The CDC 16a of a first stage is an example of a first chromatic dispersion compensator that compensates the waveform distortion caused by the chromatic dispersion with respect to the digital signals Hi, Hq, Vi and Vq. The CDC 16a of the first stage includes the FFT unit 160, chromatic dispersion compensation units 161 and 164, and IFFT units 162 and 165. Here, since the FFT unit 160, the chromatic dispersion compensation unit 161 and the IFFT unit 162 are in common with those in the CDCs 16 of the second stage and the third stage, the CDC 16a of the first stage includes the configuration of the other CDCs 16. Here, the chromatic dispersion compensation units 161 and 164 are examples of a first compensator and a second compensator, respectively.

In the CDC 16a of the first stage, the FFT unit 160 branches the digital signals Hi, Hq, Vi and Vq divided every frequency into the respective chromatic dispersion compensation units 161 and 164. Therefore, the FFT unit 160 functions as a brancher that branches the digital signals Hi, Hq, Vi and Vq into two signals. In the FFT unit 160, the digital signals Hi, Hq, Vi and Vq are branched by an electric brancher, for example. The brancher for the digital signals Hi, Hq, Vi and Vq may be provided between the FFT unit 160 and the chromatic dispersion compensation units 161 and 164.

In the CDC 16a of the first stage, the chromatic dispersion compensation unit 161 compensates the waveform distortion caused by the chromatic dispersion with respect to one of the two signals outputted from the FFT unit 160, and outputs the compensated signal to the NLC 17 of the first stage. The NLC 17 of the first stage is an example of a first nonlinear optical effect compensator that compensates the waveform distortion caused by the nonlinear optical effect with respect to the signal outputted from the CDC 16a of the first stage.

The CDC 16 of the second stage is an example of a second chromatic dispersion compensator that compensates the waveform distortion caused by the chromatic dispersion with respect to a signal outputted from the NLC 17 of the first stage. Moreover, the NLC 17 of the second stage is an example of a second nonlinear optical effect compensator that compensates the waveform distortion caused by the nonlinear optical effect with respect to a signal outputted from the CDC 16 of the second stage. According to the configuration, as described above, the compensation of the waveform distortion is effectively performed by the synergy of the CDCs 16 and the NLCs 17, and the OSNR (Optical Signal to Noise Ratio) tolerance is improved.

On the other hand, the chromatic dispersion compensation unit 164 compensates the waveform distortion caused by the chromatic dispersion by adding a characteristic opposite to a characteristic of the chromatic dispersion in the transmission line F to the digital signals Hi, Hq, Vi and Vq divided by the FFT unit 160 every frequency. Thus, the chromatic dispersion compensation unit 164 can process the digital signals Hi, Hq, Vi and Vq every frequency, so that the chromatic dispersion compensation unit 164 can easily compensate the waveform distortion. When it is premised that the chromatic dispersion compensation unit 164 compensates a large chromatic dispersion value to some extent, the chromatic dispersion compensation unit 164 can be configured with a small scale circuit in comparison with a circuitry which performs processing in the time domain.

In the present embodiment, the Fourier transformation of the digital signals Hi, Hq, Vi and Vq inputted to the respective chromatic dispersion compensation units 161 and 164 is performed by the common FFT unit 160, but may be performed by respective FFT units. In the Fourier transformation of the digital signals Hi, Hq, Vi and Vq inputted to the chromatic dispersion compensation unit 164, a bit calculation accuracy identical with a bit calculation accuracy of the digital signals Hi, Hq, Vi and Vq inputted to the chromatic dispersion compensation unit 161 is not generally required. This is because the digital signals Hi, Hq, Vi and Vq to be outputted from the chromatic dispersion compensation unit 164 are different from the digital signals Hi, Hq, Vi and Vq to be outputted from the chromatic dispersion compensation unit 161 which exists on a path for main signals, and the digital signals to be outputted from the chromatic dispersion compensation unit 164 are used only for phase synchronization.

Therefore, the bit calculation accuracy of the FFT unit corresponding to the chromatic dispersion compensation unit 164 may be made lower than that of the FFT unit corresponding to the chromatic dispersion compensation unit 161. However, when the common FFT unit 160 is used like the embodiment, there is a possibility that the circuit scale of the digital signal processing circuit 1c can be reduced, compared with the case of the use of the respective FFT units.

The chromatic dispersion compensation unit 164 compensates the waveform distortion caused by the chromatic dispersion with respect to the other one of the two signal outputted from the FFT unit 160, by using a compensation quantity corresponding to the compensation quantity of the chromatic dispersion compensation unit 161 in the CDC 16a of the first stage and the compensation quantities of the CDCs 16 of the second and the third stages. Here, in the present embodiment, the three stages of the CDCs 16 and the NLCs 17 are mentioned. However, when the number of stages of the CDCs 16 and the NLCs 17 is two, the chromatic dispersion compensation unit 164 compensates the waveform distortion by using the compensation quantity corresponding to the compensation quantity of the chromatic dispersion compensation unit 161 in the CDC 16a of the first stage and the compensation quantity of the CDC 16 of the second stage.

The chromatic dispersion compensation unit 164 compensates the waveform distortion caused by the chromatic dispersion by using all the compensation quantities of the three stages of the CDCs 16 corresponding to the waveform distortion of the digital signals Hi, Hq, Vi and Vq caused by the chromatic dispersion, as an example. That is, the chromatic dispersion compensation unit 164 composed of a circuit in a single stage performs chromatic dispersion compensation of a chromatic dispersion compensation quantity corresponding to three chromatic dispersion compensation units 161 in the respective CDCs 16. Here, in the digital signals outputted from the chromatic dispersion compensation unit 164, the bit calculation accuracy identical with the bit calculation accuracy of the digital signals outputted from the chromatic dispersion compensation unit 161 is not generally required.

The IFFT unit 165 converts the digital signals Hi, Hq, Vi and Vq whose waveform distortion has been compensated, from signals of the frequency domain to signals of the time domain. The digital signals Hi, Hq, Vi and Vq which have returned to the signals of the time domain are outputted to the PD 18.

The ADCs 60 to 63, the FFT unit 160, the chromatic dispersion compensation unit 164, the IFFT unit 165 and the PD 18 and the oscillator 7 constitute a phase locked loop L4 for controlling the phase of the digital signals Hi, Hq, Vi and Vq. The PD 18 detects the phase fluctuation of the other signal outputted from the CDC 16a of the first stage, i.e., the signal outputted from the chromatic dispersion compensation unit 164, and controls the clock signal CLK based on the detected phase fluctuation. The PD 18 functions as a controller.

More specifically, the PD 18 detects the phase fluctuation of the digital signals Hi, Hq, Vi and Vq by using the above-mentioned phase detector of the Gardner system. The oscillator 7 adjusts the frequency of the clock signal CLK based on the detection result of the PD 18.

Thus, the waveform distortion of the digital signals Hi, Hq, Vi and Vq branched from the CDC 16a of the first stage is compensated by the chromatic dispersion compensation unit 164. Therefore, the sampling phase in the ADCs 60 to 63 is controlled with high accuracy depending on the phase shift of the digital signals Hi, Hq, Vi and Vq without being affected by the waveform distortion caused by the chromatic dispersion, and hence the phase synchronization is performed.

Moreover, the PD 18 detects the phase fluctuation of the digital signals Hi, Hq, Vi and Vq branched from the CDC 16 before the final stage, i.e., the CDC 16a of the first stage, and controls the clock signal CLK based on the detected phase fluctuation. Therefore, the number of stages of the CDCs 16 and the NLCs 17 in the phase locked loop L4 is reduced compared with the number of stages in the phase locked loop L3 of the comparative example 2, and hence the delay time of the digital signals Hi, Hq, Vi and Vq in the phase locked loop L4 is reduced. That is, the delay time is reduced by removing one or more stages of the CDC 16 and the NLC 17 from the phase locked loop L4. Therefore, the following property (responsibility) of the clock signal CLK in the phase locked loop L4 is improved.

Therefore, the low-speed phase fluctuation such as the wander caused in the digital signals Hi, Hq, Vi and Vq in the transmission line F is suppressed. Thereby, the digital signal processing circuit 1c can extract the digital signals Hi, Hq, Vi and Vq from the optical signal S inputted from the transmission line F with high accuracy.

Since the chromatic dispersion compensation unit 164 compensates the waveform distortion caused by the chromatic dispersion with all the compensation quantities of the three stages of the CDCs 16 in the present embodiment, the waveform distortion of the digital signals Hi, Hq, Vi and Vq can be minimized. However, the compensation quantity is not limited to this. The compensation quantity of the chromatic dispersion compensation unit 164 may be less than or more than all the compensation quantities of the three stages of the CDCs 16 within a range without having an adverse effect on the control of the sampling phase in the ADCs 60 to 63.

Moreover, in the present embodiment, the PD 18 controls the clock signal CLK based on the phase fluctuation of the digital signals Hi, Hq, Vi and Vq branched from the CDC 16*a* of the first stage so that the delay time of the digital signals Hi, Hq, Vi and Vq in the phase locked loop L4 becomes the shortest. However, a method for controlling the clock signal CLK is not limited to this. The PD 18 may be control the clock signal CLK based on the phase fluctuation of the digital signals Hi, Hq, Vi and Vq branched from the CDC 16 of the second stage, as described below.

Figure 4:
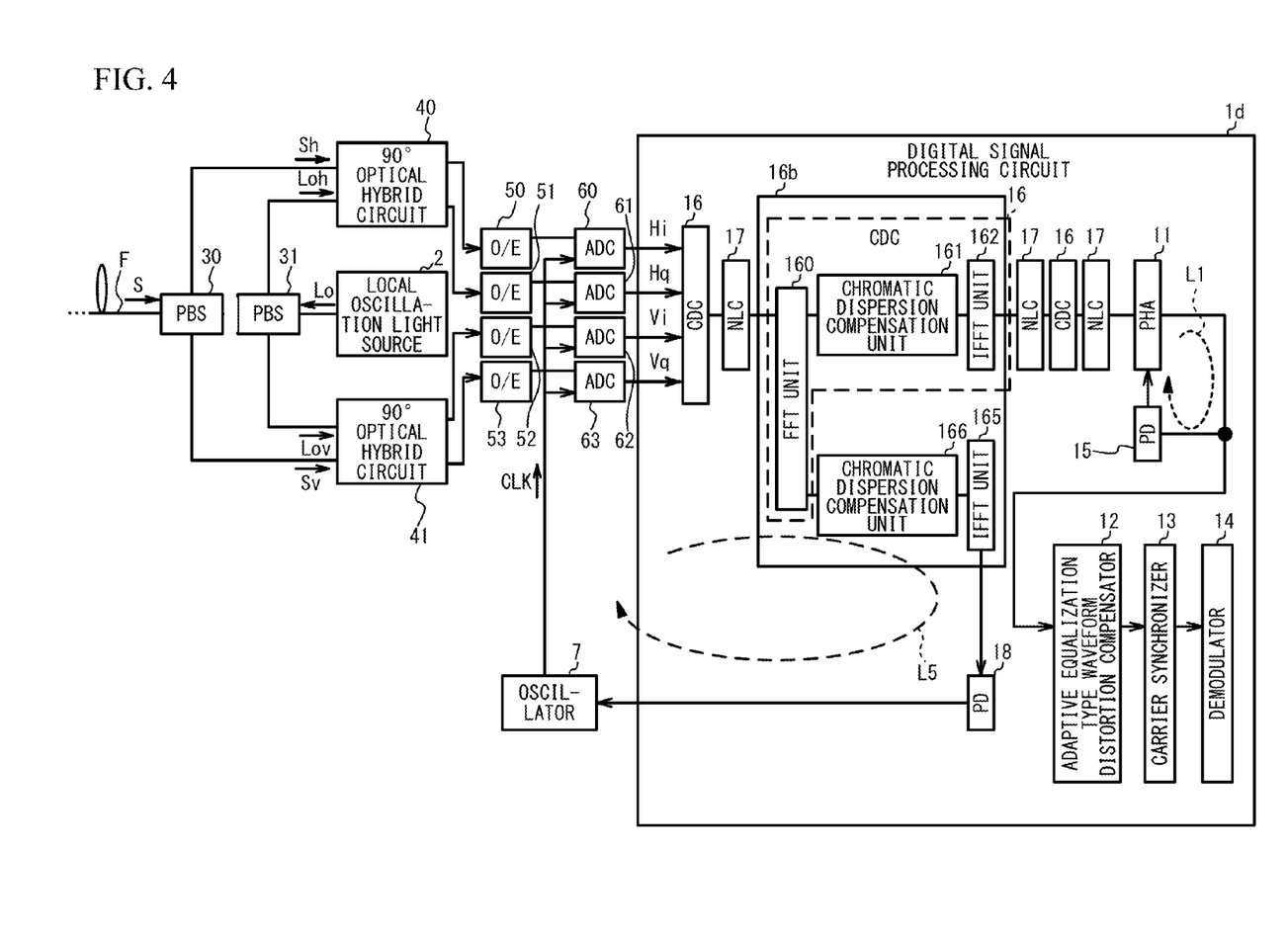
FIG. 4 is a diagram illustrating a configuration of a receiver according to another embodiment.

FIG. 4 is a diagram illustrating a configuration of a receiver according to another embodiment. In FIG. 4, elements common to those in FIGS. 1 to 3 are designated by the same numbers, and a description thereof is omitted.

The receiver includes the local oscillation light source 2, the PBSs 30 and 31, the 90° optical hybrid circuits 40 and 41, the photoelectric conversion circuits 50 to 53, the ADCs 60 to 63, the oscillator 7 and a digital signal processing circuit 1*d*.

The digital signal processing circuit 1*d* is an example of a signal processing device, and includes the three stages of CDCs 16*b* and 16, the three stages of NLCs 17, the PHA 11, the adaptive equalization type waveform distortion compensator 12, the carrier synchronizer 13, and the demodulator 14 and the PDs 15 and 18. The digital signal processing circuit 1*d* processes the digital signals Hi, Hq, Vi and Vq formed by sampling the electric signals using the clock signal CLK. The electric signals are obtained by converting the optical signal S inputted from the transmission line F. The digital signal processing circuit 1*d* is composed of one or more DSPs, for example.

In the three stages of the CDCs 16*b* and 16 and the three stages of the NLCs 17, the CDC 16*b* of the second stage includes the FFT unit 160, chromatic dispersion compensation units 161 and 166, and IFFT units 162 and 165. Here, since the FFT unit 160, the chromatic dispersion compensation unit 161 and the IFFT unit 162 are in common with those in the CDCs 16 of the first stage and the third stage, the CDC 16*b* of the second stage includes the configuration of the other CDCs 16.

In the CDC 16*b*, the FFT unit 160 branches the digital signals Hi, Hq, Vi and Vq divided every frequency into the respective chromatic dispersion compensation units 161 and 166. The chromatic dispersion compensation unit 166 is another example of the second compensator. The chromatic dispersion compensation unit 166 compensates the waveform distortion caused by the chromatic dispersion by adding a characteristic opposite to a characteristic of the chromatic dispersion in the transmission line F to the digital signals Hi, Hq, Vi and Vq branched from the CDC 16*b* of the second stage. Here, the Fourier transformation of the digital signals Hi, Hq, Vi and Vq inputted to the respective chromatic dispersion compensation units 161 and 166 is performed by the common FFT unit 160, but may be performed by respective FFT units.

Before the digital signals Hi, Hq, Vi and Vq are inputted to the chromatic dispersion compensation unit 166, a part (e.g. one third) of all the compensation quantities for the compensation of the waveform distortion caused by the chromatic dispersion is given to the digital signals Hi, Hq, Vi and Vq by the chromatic dispersion compensation unit 161 in the CDC 16 of the first stage. In this case, the chromatic dispersion compensation unit 166 needs to compensate the waveform distortion with respect to the digital signals Hi, Hq, Vi and Vq by using two thirds of all the compensation quantities as an example.

Therefore, the compensation quantity of the chromatic dispersion compensation unit 166 corresponds to the compensation quantities of two stages of the CDCs 16, i.e., two chromatic dispersion compensation units 161. Thus, the chromatic dispersion compensation unit 166 compensates the waveform distortion caused by the chromatic dispersion with respect to other signal outputted from the FFT unit 160, by using a compensation quantity corresponding to the compensation quantity of the chromatic dispersion compensation unit 161 in the CDC 16*b* of the second stage and the compensation quantity of the CDC 16 of the third stage.

The PD 18 detects the phase fluctuation of the digital signals Hi, Hq, Vi and Vq whose waveform distortion has been compensated by the chromatic dispersion compensation unit 166, and controls the clock signal CLK based on the detected phase fluctuation. Therefore, the sampling phase in the ADCs 60 to 63 is controlled with high accuracy depending on the phase shift of the digital signals Hi, Hq, Vi and Vq without being affected by the waveform distortion caused by the chromatic dispersion, and hence the phase synchronization is performed. Here, the compensation quantity of the chromatic dispersion compensation unit 166 may be less than or more than the compensation quantities of the two stages of the CDCs 16 as long as it does not adversely affect the control of the sampling phase in the ADCs 60 to 63.

In the present embodiment, the ADCs 60 to 63, the CDC 16 and the NLC 17 of the first stage, the FFT unit 160, the chromatic dispersion compensation unit 166, the IFFT unit 165, the PD 18 and the oscillator 7 constitute a phase locked loop L5 for controlling the phase of the digital signals Hi, Hq, Vi and Vq. Since the number of stages of the CDCs 16 and the NLCs 17 is reduced compared with the number of stages in the phase locked loop L3 of the comparative example 2, the delay time of the digital signals Hi, Hq, Vi and Vq in the phase locked loop L5 is reduced. Therefore, the following property of the clock signal CLK in the phase locked loop L5 is improved.

Here, in the above-mentioned embodiment, the three pairs (three stages) of CDCs 16 and NLCs 17 are provided, but the number of stages (i.e., the number of CDCs 16 and NLCs 17) has no limitation. The appropriate number of stages of the CDCs 16 and the NLCs 17 may be provided in the range of 3 to 20 stages. If the number of stages is expressed by "N (an integer of 2 or more)", the chromatic dispersion compensation unit 161 in each CDC 16 gives the digital signals Hi, Hq, Vi and Vq a part (e.g. one Nth) of all the compensation quantities of the waveform distortion by the chromatic dispersion. Moreover, each NLC 17 gives the digital signals Hi, Hq, Vi and Vq a part (e.g. one Nth) of all the compensation quantities of the waveform distortion caused by the nonlinear optical effect.

In addition, in the embodiment of FIG. 3, the compensation quantity of the chromatic dispersion compensation unit 164 becomes a total of the compensation quantities of the respective chromatic dispersion compensation units 161, for example. In the embodiment of FIG. 4, the compensation quantity of the chromatic dispersion compensation unit 164 becomes a value that subtracts the compensation quantity of the chromatic dispersion compensation unit 161 of the first stage from the total of the compensation quantities of the respective chromatic dispersion compensation units 161. That is, if the chromatic dispersion compensation units 164 and 166 are provided in the CDC 16 of an "M-th (M: an integer of 1 to N−1)" stage, the compensation quantities of the chromatic dispersion compensation units 164 and 166 becomes "D(M)+D(M+1)+ . . . +D(N)". Here, D(i) indicates the compensation quantity of the chromatic dispersion compensation unit 161 of an "i-th" stage.

Signal Processing Method

Next, a description will be given of a signal processing method according to the present embodiment. The signal processing method is a process in which the receiver illustrated in FIG. 3 or FIG. 4 processes the digital signals Hi, Hq, Vi and Vq formed by sampling the electric signals using the clock signal CLK. The electric signals are obtained by converting the optical signal S inputted from the transmission line F.

Figure 5:
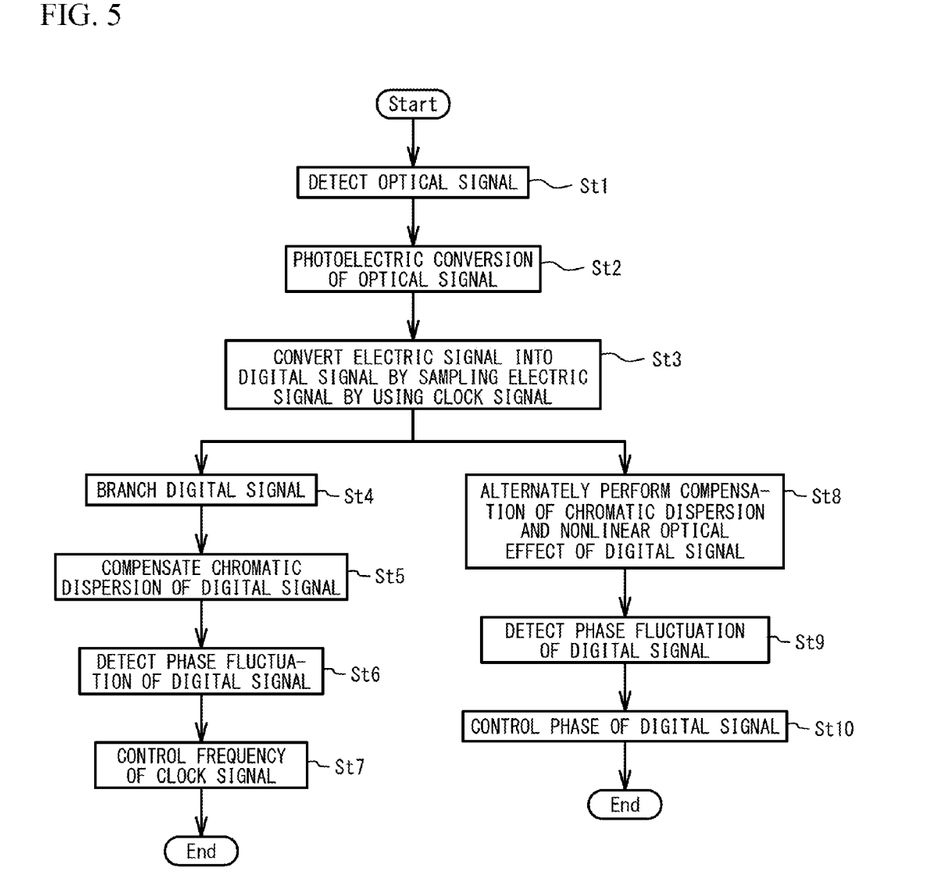
FIG. 5 is a flowchart illustrating a signal processing method.

FIG. 5 is a flowchart illustrating the signal processing method. In the following description, processes relating to the phase locked loops L1 and L4 illustrated in FIG. 3 is explained, but the same processes are performed on the phase locked loops L1 and L5 illustrated in FIG. 4.

The PBSs 30 and 31 split the optical signal S inputted from the transmission line F into the H axis and the V axis by using the local oscillation light Lo inputted from the local oscillation light source 2, and hence the 90° optical hybrid circuits 40 and 41 detect the optical signal S (step St1). Next, the photoelectric conversion circuits 50 to 53 perform photoelectric conversion on the optical signal S detected by the 90° optical hybrid circuits 40 and 41 (step St2).

Next, the ADCs 60 to 63 convert the electric signals obtained by the photoelectric conversion into the digital signals Hi, Hq, Vi and Vq, respectively, by sampling the electric signals by using the clock signal CLK (step St3). Next, the CDC of the first stage branches the digital signals Hi, Hq, Vi and Vq into the two signals and outputs one of the two signals to the chromatic dispersion compensation unit 164 (step St4). Hereinafter, processes of step St5 to St7 in the phase locked loop L4 and processes of step St8 to St10 in the phase locked loop L1 are performed in parallel.

The chromatic dispersion compensation unit 164 compensates the waveform distortion caused by the chromatic dispersion with respect to the one of the two signals, i.e., the digital signals Hi, Hq, Vi and Vq branched from the CDC 16 before the final stage (step St5). More specifically, the chromatic dispersion compensation unit 164 compensates the waveform distortion caused by the chromatic dispersion with respect to the digital signals Hi, Hq, Vi and Vq branched from the CDC 16 of the first stage. Moreover, the chromatic dispersion compensation unit 164 compensates the waveform distortion caused by the chromatic dispersion by using all the compensation quantities of the three stages of the CDCs 16 corresponding to the waveform distortion of the digital signals Hi, Hq, Vi and Vq caused by the chromatic dispersion, as an example.

Next, the PD 18 detects the phase fluctuation of the digital signals Hi, Hq, Vi and Vq whose waveform distortion has been compensated (step St6). Next, the PD 18 controls the frequency of the clock signal CLK based on the detected phase fluctuation (step St7). That is, the oscillator 7 adjusts the frequency of the clock signal CLK based on the detection result of the PD 18. Thereby, the sampling phase in the ADCs 60 to 63 is controlled with high accuracy depending on the phase shift of the digital signals Hi, Hq, Vi and Vq without being affected by the waveform distortion caused by the chromatic dispersion.

On the other hand, the three stages of the CDCs 16 and the NLCs 17 alternately compensate the waveform distortion caused by the chromatic dispersion and the nonlinear optical effect in the transmission line F with respect to the digital signals Hi, Hq, Vi and Vq (step St8). With respect to the digital signals Hi, Hq, Vi and Vq, the waveform distortion caused by the chromatic dispersion is compensated by the chromatic dispersion compensation unit 164 in each CDC 16, and the waveform distortion caused by the nonlinear optical effect is compensated by each NLC 17. That is, the three stages of the CDCs 16 and the NLCs 17 compensate the waveform distortion caused by the chromatic dispersion and the nonlinear optical effect in the transmission line F with respect to the other one of the two signals.

Next, the PD 15 detects the phase fluctuation of the digital signals Hi, Hq, Vi and Vq whose waveform distortion has been compensated by the three stages of the CDCs 16 and the NLCs 17 (step St9). Next, the PHA 11 adjusts the phase of the digital signals Hi, Hq, Vi and Vq based on the detection result of the PD 15 (step St10). In this way, the signal processing in the receiver is performed.

As described above, the digital signal processing circuit 1c or 1d processes the digital signals Hi, Hq, Vi and Vq formed by sampling the electric signals using the clock signal CLK. The electric signals are obtained by converting the optical signal S inputted from the transmission line F. The digital signal processing circuit 1c or 1d includes the CDC 16a or 16b, the NLCs 17 and the PD 18.

The CDC 16a or 16b compensates the waveform distortion caused by the chromatic dispersion with respect to the digital signals Hi, Hq, Vi and Vq. The NLCs 17 compensate the waveform distortion caused by the nonlinear optical effect with respect to one of the two signals outputted from the CDC 16a or 16b. The PD 18 detects the phase fluctuation of the other one of the two signals outputted from the CDC 16a or 16b, and controls the clock signal CLK based on the detected phase fluctuation.

According to the above-mentioned configuration, the CDC 16a or 16b and the NLCs 17 compensate the waveform distortion of the digital signals Hi, Hq, Vi and Vq caused by the chromatic dispersion and the nonlinear optical effect, respectively. Therefore, the waveform distortion of the digital signals Hi, Hq, Vi and Vq caused by the chromatic dispersion and the nonlinear optical effect is compensated.

Moreover, the PD 18 detects the phase fluctuation of the signal whose waveform distortion has been compensated by the CDC 16a or 16b, and controls the clock signal CLK based on the detected phase fluctuation. Therefore, the sampling phase of the digital signals Hi, Hq, Vi and Vq is controlled with high accuracy depending on the phase shift of the digital signals Hi, Hq, Vi and Vq without being affected by the waveform distortion caused by the chromatic dispersion, and hence the phase synchronization is performed.

Moreover, since the NLCs 17 are eliminated from the phase locked loops L4 and L5, the delay time of the digital signals Hi, Hq, Vi and Vq in the phase locked loops L4 and L5 is shortened. Therefore, the following property (responsibility) of the clock signal CLK in the phase locked loops L4 and L5 is improved.

Therefore, according to the digital signal processing circuit 1c or 1d, the phase fluctuation of the digital signals Hi, Hq, Vi and Vq is suppressed.

The signal processing method according to the embodiment is a method for processing the digital signals Hi, Hq, Vi and Vq formed by sampling, using the clock signal CLK, the electric signals obtained by converting the optical signal S inputted from the transmission line F. The signal processing method includes the following steps.

Step (1): branching the digital signals Hi, Hq, Vi and Vq into two signals;

Step (2): compensating the waveform distortion caused by the chromatic dispersion and the nonlinear optical effect in the transmission line F with respect to one of the two signals;

Step (3): compensating the waveform distortion caused by the chromatic dispersion with respect to the other one of the two signals;

Step (4): detecting the phase fluctuation of the other signal whose waveform distortion has been compensated; and Step (5): controlling the clock signal CLK based on the detected phase fluctuation.

Since the signal processing method according to the embodiment includes the same configuration or function as the digital signal processing circuit $1c$ or $1d$ according to the embodiment, the same effect as the above-mentioned digital signal processing circuit $1c$ or $1d$ is obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A signal processing device that processes a digital signal formed by sampling an electric signal using a clock signal, the electric signal being obtained by converting an optical signal inputted from a transmission line, the signal processing device comprising:
    a first chromatic dispersion compensator that branches the digital signal into two signals, compensates a waveform distortion caused by a chromatic dispersion with respect to one of the two signals, and compensates the waveform distortion caused by the chromatic dispersion with respect to other one of the two signals by using a compensation quantity corresponding to a compensation quantity of the waveform distortion caused by the chromatic dispersion with respect to the one of the two signals;
    a first nonlinear optical effect compensator that compensates a waveform distortion caused by a nonlinear optical effect with respect to the one of the two signals outputted from the first chromatic dispersion compensator; and
    a controller that detects a phase fluctuation of the other one of the two signals outputted from the first chromatic dispersion compensator, and controls the clock signal based on the detected phase fluctuation.

2. The signal processing device as claimed in claim 1, further comprising:
    a second chromatic dispersion compensator that compensates the waveform distortion caused by the chromatic dispersion with respect to a signal outputted from the first nonlinear optical effect compensator; and
    a second nonlinear optical effect compensator that compensates the waveform distortion caused by the nonlinear optical effect with respect to a signal outputted from the second chromatic dispersion compensator.

3. A signal processing method that processes a digital signal formed by sampling an electric signal using a clock signal, the electric signal being obtained by converting an optical signal inputted from a transmission line, the signal processing method comprising:
    branching the digital signal into two signals;
    compensating a waveform distortion caused by a chromatic dispersion and a nonlinear optical effect in the transmission line with respect to one of the two signals;
    compensating a waveform distortion caused by a chromatic dispersion with respect to the other one of the two signals, by using a compensation quantity corresponding to a compensation quantity of the waveform distortion caused by the chromatic dispersion with respect to the one of the two signals;
    detecting a phase fluctuation of the other one of the two signals whose waveform distortion has been compensated; and
    controlling the clock signal based on the detected phase fluctuation.

* * * * *